US005500680A

United States Patent [19]

Lee

[11] Patent Number: 5,500,680
[45] Date of Patent: Mar. 19, 1996

[54] CAPTION DISPLAY CONTROLLING DEVICE AND THE METHOD THEREOF FOR SELECTIVELY SCROLLING AND DISPLAYING A CAPTION FOR SEVERAL SCENES

[75] Inventor: Eun P. Lee, Seoul, Rep. of Korea

[73] Assignee: Goldstar Co., Ltd., Seoul, Rep. of Korea

[21] Appl. No.: 134,020

[22] Filed: Oct. 8, 1993

[30] Foreign Application Priority Data

Oct. 12, 1992 [KR] Rep. of Korea ............. P92-18745

[51] Int. Cl.⁶ .................................................. H04N 7/087
[52] U.S. Cl. ......................................... 348/468; 348/564
[58] Field of Search ................................ 348/563, 564, 348/461, 468, 478, 588, 589; 358/147, 142; 345/123, 124, 125, 118; H04N 7/087, 7/08, 5/44, 5/445, 5/278

[56] References Cited

U.S. PATENT DOCUMENTS

| | | | |
|---|---|---|---|
| 3,891,792 | 6/1975 | Kimura | 348/564 |
| 4,320,395 | 3/1982 | Meissen et al. | 345/124 |
| 4,549,173 | 10/1985 | Nakamura et al. | 345/123 |
| 4,675,737 | 6/1987 | Fujino et al. | 348/511 |
| 5,202,669 | 4/1993 | Ishimachi et al. | 348/563 |

FOREIGN PATENT DOCUMENTS

| | | | |
|---|---|---|---|
| 0497235 | 8/1992 | European Pat. Off. | H04N 7/087 |
| 0146087 | 6/1987 | Japan | H04N 7/080 |
| 0129680 | 5/1989 | Japan | H04N 7/080 |
| 0250872 | 11/1991 | Japan | H04N 5/278 |

OTHER PUBLICATIONS

Veith, Richard H. "Television's Teletext" Elsevier Science Publishing Co, Inc pp. 99–100 1983.

*Primary Examiner*—David E. Harvey
*Attorney, Agent, or Firm*—Jacobson, Price, Holman & Stern

[57] ABSTRACT

A caption display controlling device and the method thereof for displaying, on a screen, captions for several scenes sequentially scrolled-up. The device includes a caption controller that decodes caption data extracted from an input composite video signal according to selection of a caption mode, a text mode or a scroll caption mode, and controls captions for several scenes to be sequentially scrolled up on the screen in the scroll text mode. According to the invention, words for previous scenes and words for the current scene are displayed scrolled up on the screen, so that the contents of the captions can be more easily understood and accordingly convenience and efficiency in watching a captioned video for language study can be improved.

3 Claims, 5 Drawing Sheets

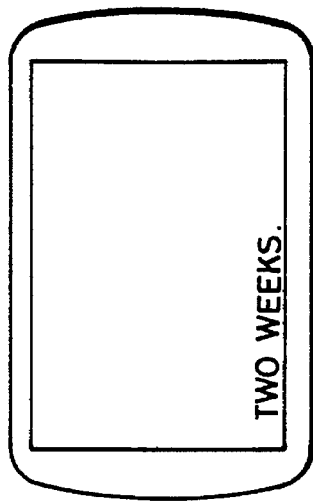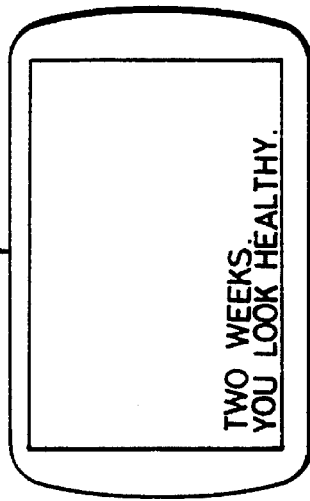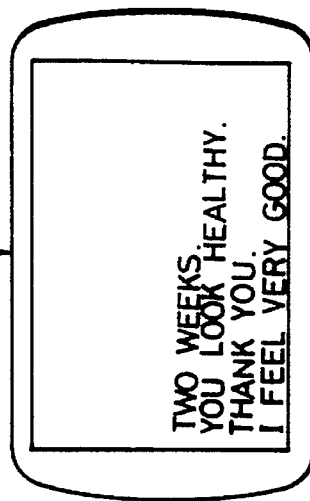
FIG.7A  FIG.7B  FIG.7C
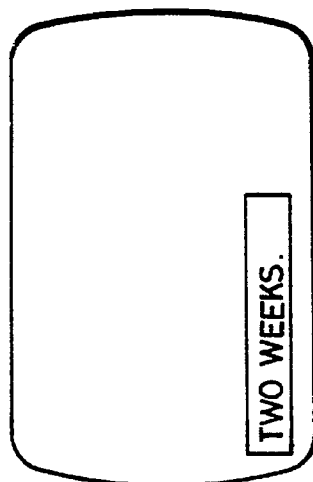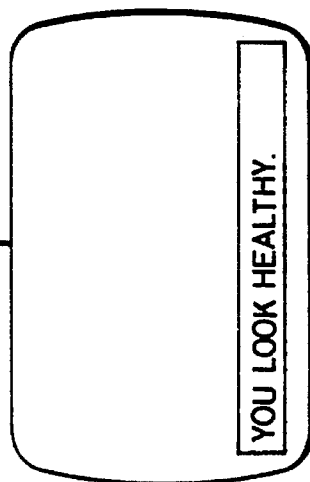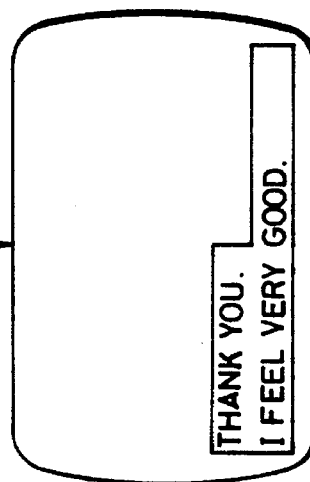
FIG.4A  FIG.4B  FIG.4C

CAPTION DISPLAY CONTROLLING DEVICE AND THE METHOD THEREOF FOR SELECTIVELY SCROLLING AND DISPLAYING A CAPTION FOR SEVERAL SCENES

BACKGROUND OF THE INVENTION

The present invention relates to an image processing device having a caption function, and more particularly to a caption display controlling device and the method thereof which can scroll up and display on a screen a caption for several scenes at need.

In a caption image device such as a caption video cassette recorder (VCR), a caption signal can be displayed as caption in a specific position of a display screen by being separated and decoded from a composite video signal having an encoded caption signal in the form of digital data. That is, original words are encoded in the 21st line of an odd field of a video signal and are decoded to be displayed on the top or the bottom of the screen as a caption by selection of viewer (in a closed caption). Meanwhile, to help the understanding of native viewers, captions may be processed by dubbing words written in their native language in a video tape, etc. manufactured in a foreign country. However, in this case, the viewers cannot arbitrarily select the presence of dubbed caption display (in an open caption).

FIG. 1A shows that a caption is displayed in a specific position of the screen by decoding closed caption data included in a composite video signal. That is, in a caption mode, a caption display device divides, for example, a television screen into a total of fifteen lines L1 to L15, and displays a caption in either the top four lines L1 to L4 or the bottom four lines L12 to L15. Also, in a text mode, text data are displayed in the total of fifteen lines L1 to L15 of the screen as shown in FIG. 1B.

Referring to FIG. 2, construction of a conventional caption display device is illustrated. The device has a caption module 1 for decoding caption data from a composite video signal supplied from a television or a VCR to display a caption. And, a video superimposing section 7 is provided for superimposing the caption video signal obtained in the caption module 1 on the original composite video signal to display the superimposed image on the screen. The caption module 1 comprises a caption data extraction section 2 for extracting caption data encoded in the composite video signal, a caption controller 3 for controlling the decoding of the extracted caption data, a sync signal separating section 4 for separating horizontal and vertical sync signals needed for the caption function from the composite video signal, an on-screen display section 5 for constructing a caption to be displayed on the screen under the control of the caption controller 3, and a control logic section 6 for providing operation clocks and signal processing timing control signals for the respective elements.

Operation of a conventional caption display device constructed as above will now be explained with reference to FIGS. 2 and 3.

The caption data extraction section 2 extracts digital caption data encoded in a composite video signal and supplies the extracted data to caption controller 3. Caption controller 3 decodes a caption's display position on a screen, a font, and characters to be actually displayed by decoding caption data composed of a control code and a character code and supplies the decoded result to on-screen display section 5 as on-screen display (OSD) information. On-screen display section 5 includes a video memory (RAM), a font memory (ROM), etc., and stores OSD information assigned by caption controller 3 and also supplies the stored information to superimposing section 7.

That is, in the caption data, the control code is decoded as information indicating the top or bottom four lines among the total fifteen lines on the screen where the caption will be positioned, and also indicating fonts, etc., and the character code is decoded as character information to be actually displayed on the screen. On-screen display section 5 accesses its internal font ROM in accordance with the decoding result of caption controller 3 and supplies the accessed OSD data to superimposing section 7. Superimposing section 7 makes a single video signal by superimposing on the composite video signal a caption OSD signal supplied from on-screen display section 5 and displays the superimposed video signal on the screen.

As described above, the caption can be displayed in the bottom four lines L12 to L15 among the total of fifteen lines L1 to L15 of the screen in the caption mode, as shown in FIG. 1A, and can be displayed, as shown in FIG. 1B, in the overall lines of the screen in the text mode. On-screen display section 5 uses as reference signals the horizontal and vertical sync signals provided from sync separation section 4 and processes OSD data under the timing control of control logic section 6. Accordingly, discrimination is improved by displaying characters of the caption generally with a white color and the background of each existing character with a box in black. That is, only the 1-character parts before and after the character existing part are processed as background, and the other parts of the four lines are processed to be transparent to show the original image.

However, in such a conventional caption display device, words (caption) corresponding to the scene are displayed for a short time in every scene. And, whenever the scene is changed, the words for the previous scene are erased and new words for the new scene are displayed. Accordingly, while watching captioned video, the viewer may watch the next scene without completely understanding the content of words, depending on his language ability. Accordingly, there are problems of inconvenience in watching video and degrading language study efficiency.

SUMMARY OF THE INVENTION

It is an object of the present invention to provide a caption display controlling device and the method thereof that can help a person understand a caption by scrolling up and displaying the caption to display on the single screen words for the previous scene and words for the current scene, and accordingly can improve convenience and efficiency in watching captioned video and studying a language.

To achieve the object, the present invention provides a caption display controlling device which comprises:

means for extracting caption data encoded in an input composite video signal;

means for selecting a caption mode, a text mode or a scroll caption mode and providing a caption control signal corresponding to the selected mode;

a caption controller for controlling decoding of the extracted caption data according to the caption control signal from the mode selection means and providing a caption display control signal according to the caption control signal corresponding to the selected mode, the controller providing the caption display control signal for scrolling up on one screen the captions for several scenes in the scroll caption mode;

on-screen display means for receiving horizontal and vertical sync signals separated from the composite video signal as reference signals for displaying the caption and providing an on-screen display signal for constructing the caption to be displayed on the screen by being controlled in response to the caption display control signal from the caption controller;

control logic means for providing timing control signals for controlling signal processing timing of the caption data extraction means, the caption controller and the on-screen display means; and video superimposing means for superimposing the on-screen display signal provided from the on-screen display means on the composite video signal and providing the superimposed signal to be displayed on the screen.

To achieve the object, the present invention also provides a caption display controlling method which comprises the steps of:

discriminating one mode selected from a caption mode, a text mode and a scroll caption mode;

decoding caption data encoded in an input composite video signal when the caption mode is selected, and displaying the decoded text in a predetermined portion of the screen;

decoding text data when the text mode is selected, and displaying the decoded caption in the overall screen; and decoding the caption data and sequentially scrolling up and displaying the decoded caption for a current scene together with captions for previous scenes on the screen when the scroll text mode is selected.

BRIEF DESCRIPTION OF THE DRAWINGS

The above object and other advantages of the present invention will become more apparent by describing the preferred embodiment of the present invention with reference to the attached drawings, in which:

FIGS. 4A to 4C show how captions can be displayed by a conventional device;

FIGS. 7A to 7C show how the captions can be displayed according to the present invention.

DETAILED DESCRIPTION OF THE PREFERRED EMBODIMENT

Figure 1A:
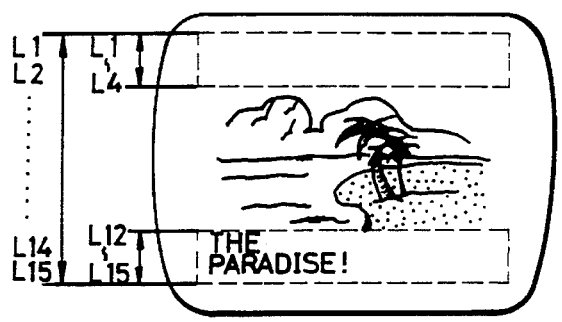
FIGS. 1A and 1B show how captions can be displayed on a screen.
Figure 1B:
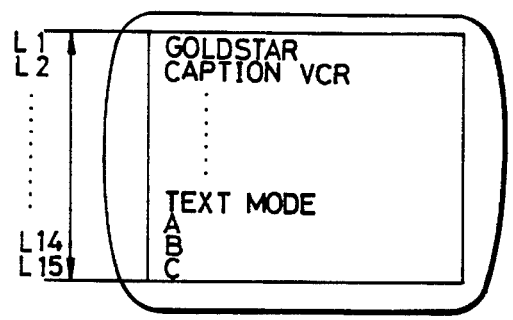
Figure 2:
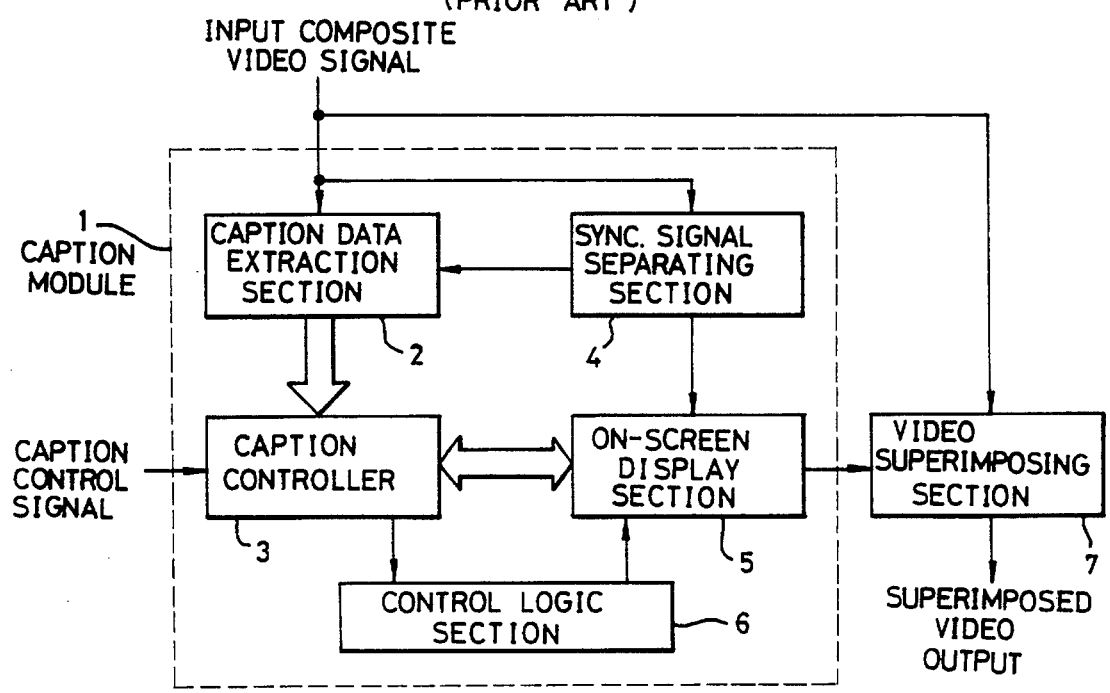
FIG. 2 is a block diagram of a conventional caption display device.
Figure 3:
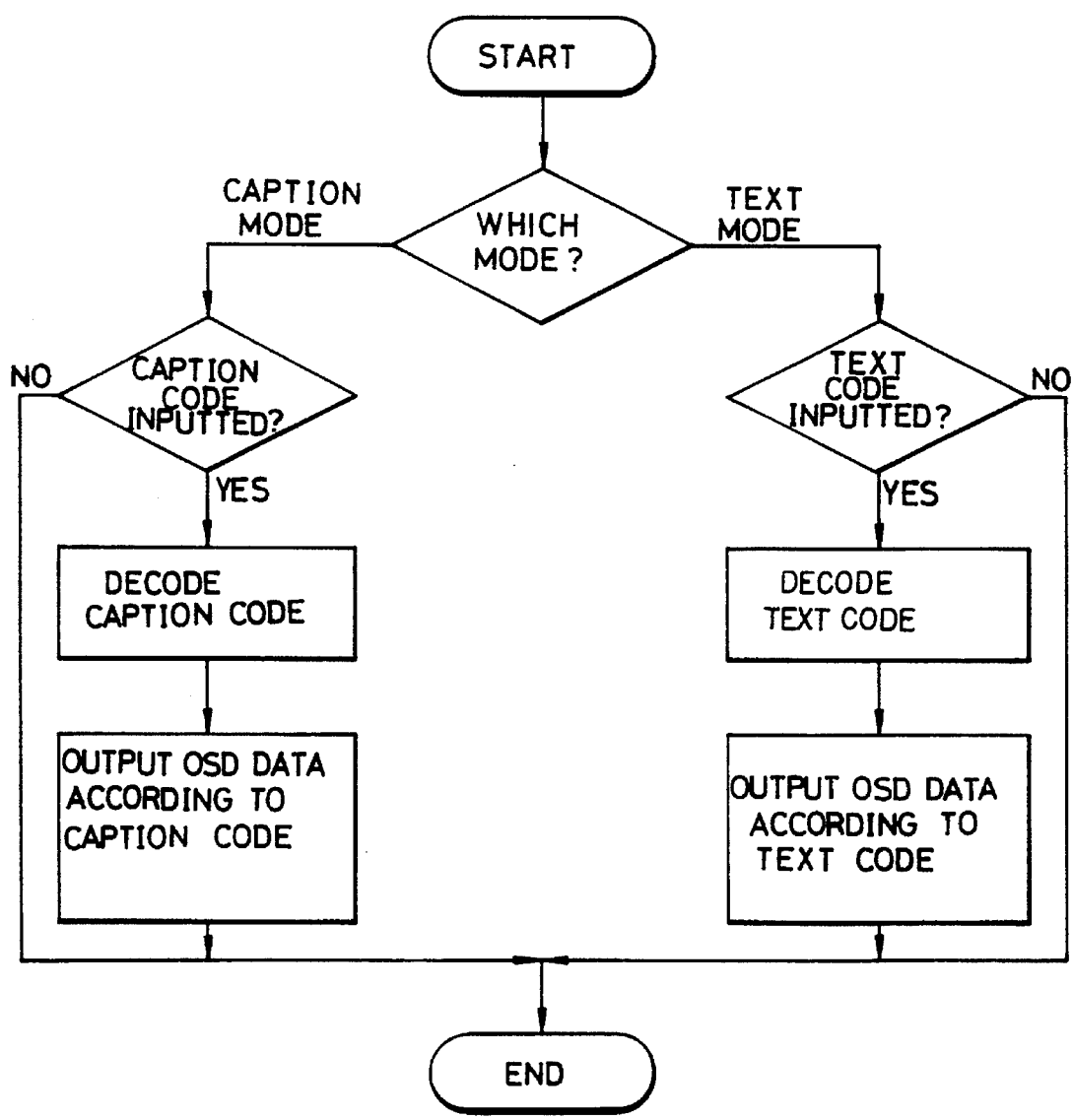
FIG. 3 shows an algorithm where a conventional caption display controlling method to be applied in the device of FIG. 2 is applied.
Figure 5:
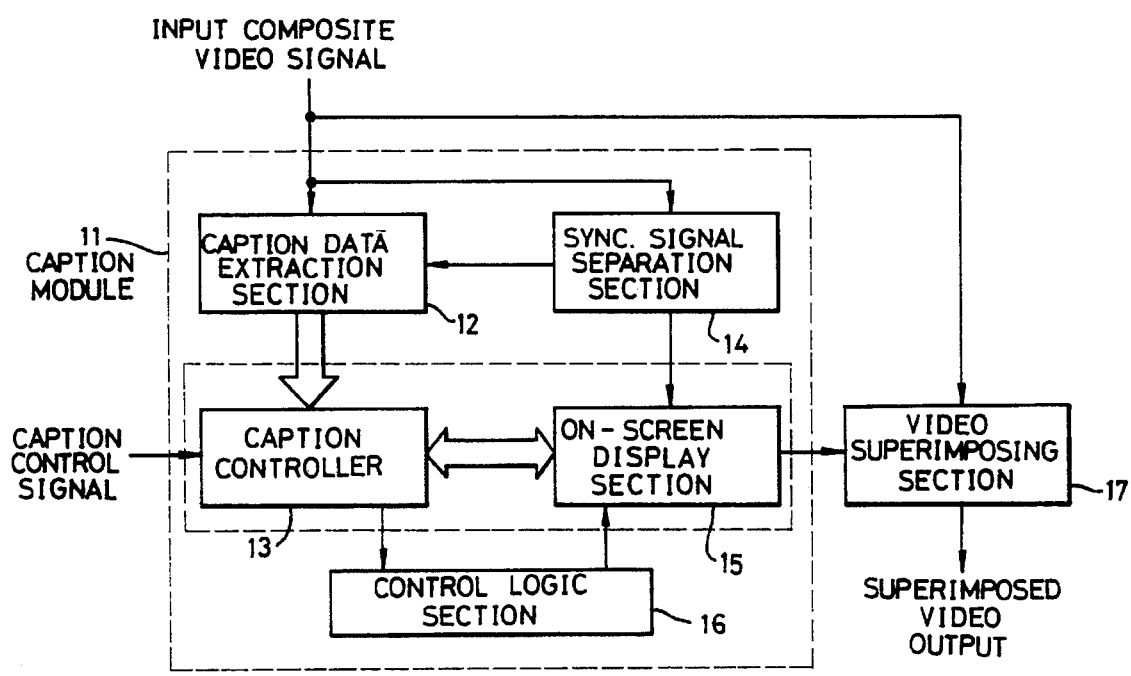
FIG. 5 is a block diagram of a caption display controlling device according to the present invention.

Referring to FIG. 5, the caption display controlling device of the present invention has a caption module 11 for displaying on a screen a caption corresponding to a corresponding mode according to a caption control signal for setting a caption mode, a text mode or a scroll caption mode by decoding caption data encoded in a composite video signal, and also has video superimposing section 17 for superimposing the caption signal obtained in caption module 11 on the composite video signal.

Caption module 11 is provided with caption data extraction section 12 for extracting caption data encoded in the composite video signal, caption controller 13 for controlling the decoding of the extracted caption data to have a caption display on a screen corresponding to the caption mode, the caption mode or the scroll text mode according to the input caption control signal, sync signal separation section 14 for separating from the composite video signal horizontal and vertical sync signals needed in performing a caption function, on-screen display section 15 for constructing a caption corresponding to a caption mode, a text mode or a scroll caption mode to be displayed on a screen under the control of caption controller 13, and control logic section 16 for providing operation clocks and signal processing timing control signals for the respective elements.

Figure 6:
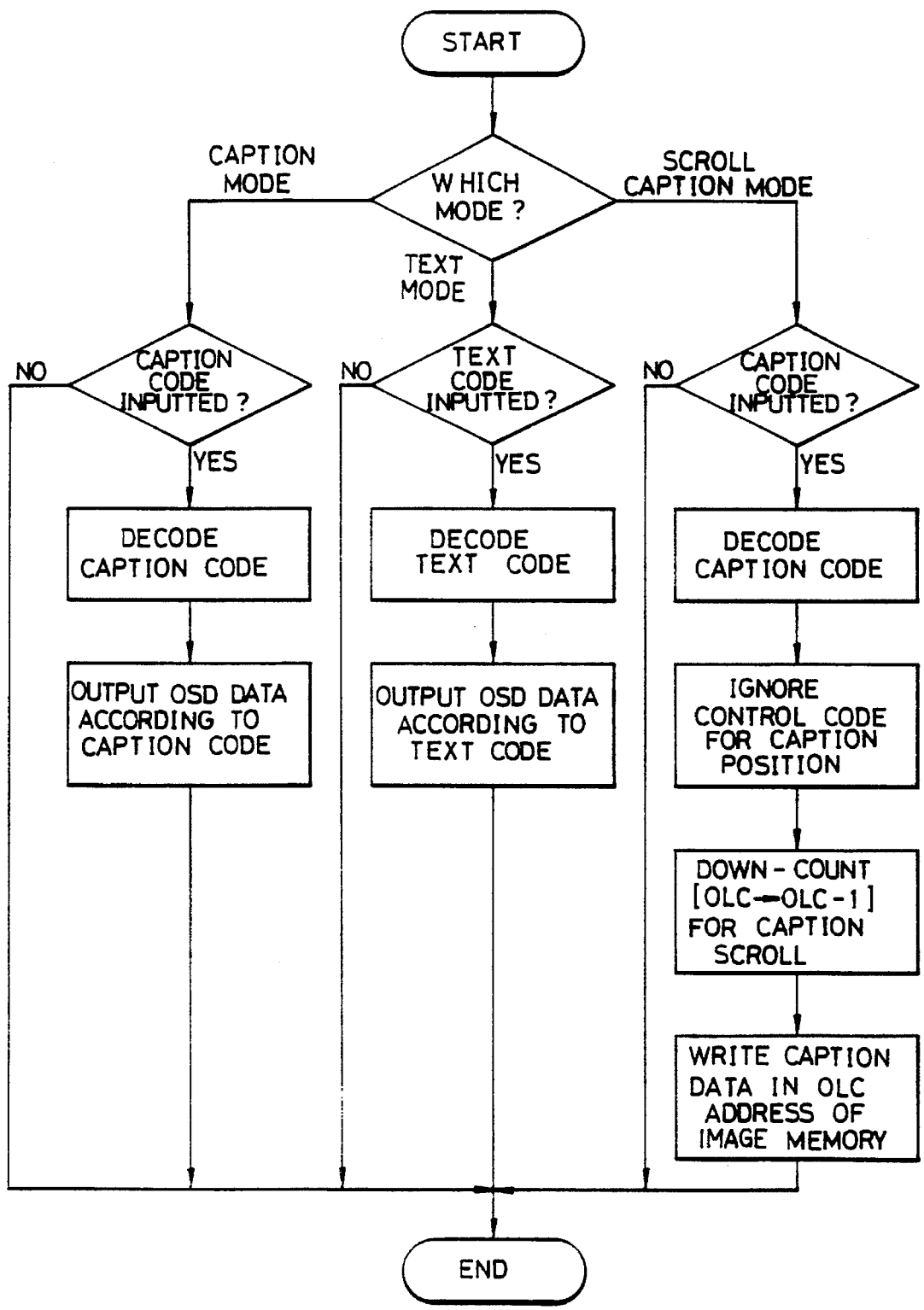
FIG. 6 shows an algorithm where the caption display controlling method according to the present invention is applied.

FIG. 6 is an algorithm diagram showing a caption display controlling method implemented by the present device having the above construction. The method comprises the steps of: discriminating one mode selected from a caption mode, a text mode and a scroll caption mode; decoding caption data included in an input composite video signal when the caption mode is selected, and displaying the decoded caption in a predetermined portion of the screen; decoding text data when the text mode is selected, and displaying the decoded caption on the overall screen; and decoding the caption data and sequentially scrolling up and displaying the decoded caption for a current scene with captions for previous scenes when the scroll caption mode is selected.

The characteristics and operations of the caption display controlling device and its method thereof according to the present invention having the above construction is described in detail with reference to FIGS. 5 to 7.

Caption data extraction section 12 extracts caption data loaded on the composite video signal and supplies extracted caption data to caption controller 13. Caption controller 13 discriminates a corresponding caption display mode selected by the user in response to the caption signal according to the selection of a caption mode, a caption mode or a scroll text mode.

Caption data supplied from caption data extraction section 12 is decoded in caption controller 13 to discriminate the position, the font, the character information, etc. of the caption to be displayed on the screen, and supplies the discriminated result to on-screen display section 15.

When the display mode discriminated in caption controller 13 is a caption mode, caption controller 13 discriminates the presence or absence of input of the caption code. If the caption code is fed, it is decoded and corresponding OSD data is recorded in the image memory of on-screen display section 15 to display characters of the decoded caption on the screen.

On-screen display section 15 accesses its internal font memory according to data recorded in its image memory and supplies OSD data for the corresponding character. OSD data is displayed on the screen superimposed on the original composite video signal in superimposing section 17. In the caption mode, the caption is displayed at the top or bottom of the screen. Meanwhile, sync separation section 14 separates a horizontal sync signal and a vertical sync signal and supplies the separated signals to caption data extraction section 12 and on-screen display section 15. Also, control logic section 16 is in charge of timing control in the above data processing.

Also, when the display mode discriminated in caption controller 13 is a text mode, caption controller 13 discriminates the presence or absence of input of text code. If the text code is fed, it is decoded and the corresponding OSD is recorded in image memory of on-screen display section 15 to display the character of the decoded caption.

On-screen display section 15 accesses its internal font memory according to the data recorded in image memory and supplies the corresponding OSD data, which is displayed on the screen superimposed on the original video signal in superimposing section 17. In the text mode, the caption is displayed on the overall screen.

Meanwhile, when the display mode discriminated in caption controller 13 is a scroll caption mode, caption controller 13 discriminates the presence or absence of input of caption code. If the caption code is fed, it is decoded. At this time, the caption code is decoded ignoring the control code assigning the position of caption, to read the character code (character data).

At the same time, caption controller 13 assigns to on-screen display section 15 a box for assigning an on-screen displayed portion of the screen, which may be the overall screen or a portion thereof. Thus, scroll-up of caption can be performed in a desired portion of the screen by adjusting the position and the size of the box for assigning the on-screen displayed portion.

For example, a box having a size of 15 lines×32 characters assigns the overall screen as the on-screen displayed portion. Also, about half of the top or bottom screen can be assigned as the on-screen displayed portion to show the original image on the remaining portion of the screen.

If the size of the on-screen displayed portion is assigned as described above, the count of on-screen display line counter OLC is reduced by 1 to scroll up the caption within the assigned on-screen displayed portion. Decoded caption data is written in the address of image memory assigned by the reduced counter value. That is, one top line of the on-screen displayed picture disappears on the screen and one bottom line remains as a blank line. Accordingly, data of the newly decoded caption is displayed in the blank line.

FIGS. 7A to 7C show how the caption is displayed in a scroll caption mode according to the present invention. At first timing, the decoded caption data is displayed on the screen as shown in FIG. 7A, and at next timing, 1-line scrolled-up caption data is displayed as shown in FIG. 7B. At further next timing, caption data is displayed with being scrolled-up by 2 lines.

The above scroll-up of caption is performed on the overall screen or within a desired portion of the screen as described above, and this can be done by adjusting the position and the size of the box for assigning the on-screen displayed portion of the screen.

From the foregoing, it will be apparent that according to the present invention, captions for several scenes are sequentially scrolled up and displayed on a screen, so that the contents of the caption can be more easily understood and accordingly high learning efficiency can be expected during watching a captioned video while learning a language.

Although the present invention has been described and illustrated herein with reference to the preferred embodiment thereof, it will be understood by those skilled in the art that various changes in form and detail may be made therein without departing from the spirit and scope of the invention.

What is claimed is:

1. A caption display controlling method for displaying characters from extracted caption and text data encoded in a video composite signal on a video display screen comprising the steps of:

discriminating one mode selected from (1) a caption mode, wherein characters from extracted caption data are displayed in a display region of the screen defined by a fixed number of video screen lines at a screen location determined from the extracted caption data; (2) a text mode, wherein characters from extracted text data are displayed over the entire video display screen; and (3) a scroll caption mode, wherein characters from extracted caption data are displayed in a display region of the screen defined by a variable number of screen lines, said characters being displayed including characters associated with the current video scene being displayed and previous displayed video scenes;

decoding caption data encoded in an input composite video signal and displaying the characters decoded from said caption data in a predetermined portion of a screen when said caption mode is selected;

decoding text data encoded in an input composite video signal and displaying the characters decoded from said text data on the overall screen when said text mode is selected; and decoding caption data and sequentially scrolling up and displaying the characters decoded from said caption data for a current scene together with captions for previous scenes on a display region of the screen defined by a variable number of video screen lines up to the overall number of video screen lines of the screen when the scroll caption mode is selected.

2. A caption display controlling method as claimed in claim 1, wherein said scrolling up displaying step includes a substep of selecting a position and a size of said on-screen displayed portion of the screen.

3. A caption display controlling device comprising:

means for extracting encoded caption data from a received composite video signal;

an on-screen display means which receives horizontal and vertical sync signals separated from the received video signal and which operates to display the extracted caption data on a display screen of the display means;

means generating a selection signal which identifies one of: (1) a caption mode in which portions of the extracted caption data are sequentially displayed within a region of said display screen wherein the region comprises a fixed number of video lines; (2) a text mode in which portions of the extracted caption data are simultaneously displayed over the entire display screen of the display means; and (3) a scroll caption mode in which portions of the extracted caption data are displayed such that the portions are scrolled within a region of said display screen wherein the region comprises any one of different selectable numbers of video lines; and a caption controller for receiving the selection signal and for controlling the display of the extracted caption data on the display screen in accordance with the mode identified by said selection signal, said caption controller including means for selectively determining the number of lines which comprises the region of the display screen within which the portions of the caption data are scrolled in said scroll caption mode.

* * * * *